June 2, 1925.  
H. TAYLOR  
BUMPER  
Filed Dec. 3, 1924　　2 Sheets-Sheet 1

1,539,970

Inventor  
Huston Taylor  
By Frank E. Liverance, Jr.  
Attorney.

June 2, 1925.

H. TAYLOR

BUMPER

Filed Dec. 3, 1924    2 Sheets-Sheet 2

Inventor
Huston Taylor
By Frank E. Liverance, Jr.
Attorney.

Patented June 2, 1925.

1,539,970

UNITED STATES PATENT OFFICE.

HUSTON TAYLOR, OF DETROIT, MICHIGAN.

BUMPER.

Application filed December 3, 1924. Serial No. 753,537.

*To all whom it may concern:*

Be it known that I, HUSTON TAYLOR, a citizen of the United States of America, residing at Detroit, in the county of Wayne and State of Michigan, have invented certain new and useful Improvements in Bumpers; and I do hereby declare the following to be a full, clear, and exact description of the invention, such as will enable others skilled in the art to which it appertains to make and use the same.

This invention relates to a bumper particularly adapted for use at the front and rear ends of motor vehicles. It is a primary object and purpose of the present invention to produce a tubular bumper which, at its ends, may be made flaring and widened, and at the same time turned in toward the motor vehicle. A further object of the invention is to mount said tubular bumper in a novel and effective manner by means of springs which in addition to yieldingly supporting the tubular bumper bar and absorbing the shocks of impact to which said bar may be subjected, further afford and present relatively wide faces against which bumpers on other motor vehicles may engage, thereby preventing the passage of such other bumpers under or above the bumper bar of my bumper construction. Various other novel features and constructions will appear as understanding of the invention is had from the following description, taken in connection with the accompanying drawings, in which, Fig. 1 is a plan view of a bumper made in accordance with my invention.

Like reference characters refer to like parts in the different figures of the drawings.

Figure 1:
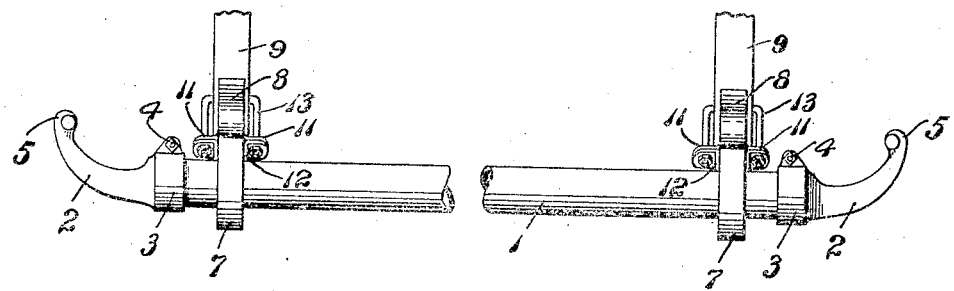
Figure 2:
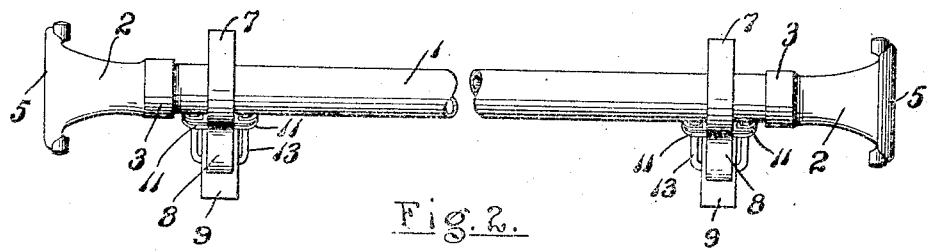
Fig. 2 is a front elevation thereof.

The impact member of the bumper comprises a length of tubing 1, at each end of which, in the construction shown in Figs. 1 and 2, a widened and flared and rearwardly curved casting 2 is located, each at its inner end having a split sleeve 3 adapted to be passed over the end of the tube 1 and clamped thereon by the bolts 4, shown in Fig. 1, which pass through ears projecting from the sleeves. The outer ends of the members 2 may be of any attractive and suitable design, as indicated at 5, the particular design shown, however, being in no way essential to the invention.

Figure 3:
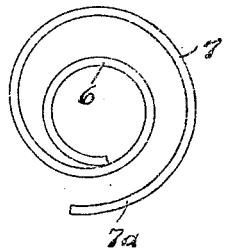
Fig. 3 is an elevation of the type of spring support used with the bumper construction.
Figure 4:
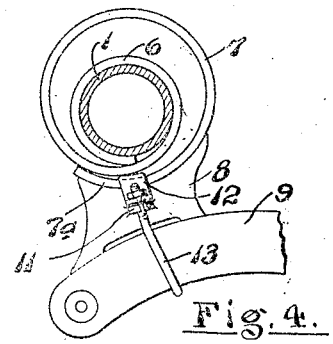
Fig. 4 is a transverse vertical section through said bumper construction at a point between its ends.
Figure 5:
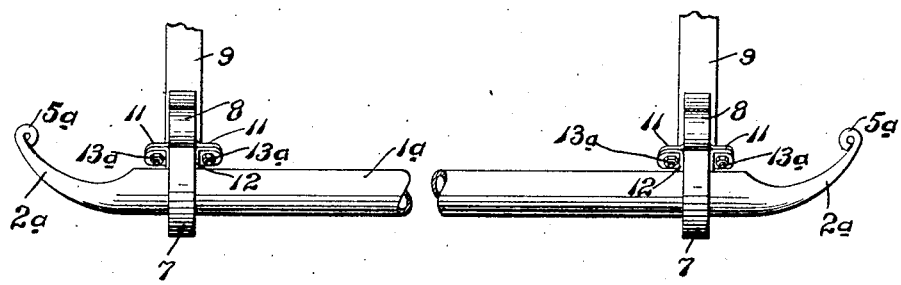
Fig. 5 is a view similar to Fig. 1, showing a different form of construction of bumper.

Inwardly from each end of the tube 1, spring supporting members are located, each including an inner coil 6 through which the tube is passed, which is continued in an enlarged outer coil 7, terminating in a free end 7ª which is spaced a distance from the adjacent inner coil, as shown in Fig. 3, when the spring is free from connection to the brackets used to connect the same to the motor vehicle chassis frame members, as will now be described.

Two brackets 8 are used to attach the bumper to the chassis frame members 9 of the motor vehicle to which the bumper is to be applied. Said brackets are located above and at the ends of the frame members and may be secured in place by bolts 10 (see Fig. 8). The upper side of each bracket is concaved on a shorter radius of curvature than the radius of the end section 7ª of the spring support so that when said end section 7ª is drawn down thereinto, it is forced to conform to the upper side of the bracket and the end is brought upwardly against the adjacent coil of the spring, pressing tightly against the same, this obviating rattling and holding the bumper bar against whipping under the road shocks and vibrations incident thereto.

Figure 7:
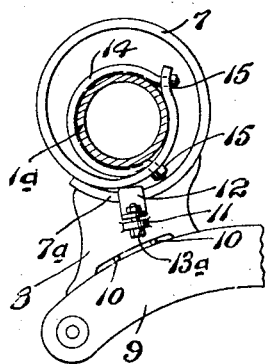
Fig. 7 is a transverse vertical section through the bumper between its ends.
Figure 6:
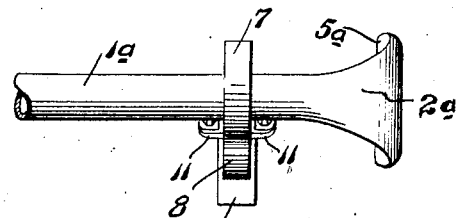
Fig. 6 is a fragmentary front elevation thereof.

An ear 11 projects laterally from each side of each bracket 8. A U-shaped clip 12 is placed over the terminal section 7ª and its ends are formed with outwardly extending ears to lie above the ears 11 of the brackets. A U-bolt 13 is placed under each frame member 9, the legs thereof extending upwardly through openings in ears 11 and in the ears on the clips 12, nuts being threaded on to the upper ends of the legs of the U-bolts to bind the parts securely together. When such U-bolts are used, it is not essential that the bolts 10 be used, the U-bolts serving not only to connect the springs to the brackets but also securing the brackets to the chassis frame members. Short bolts 13ª passed through the ears 11 and the ears of the clips, as shown in Figs. 7 and 8 may be used when the brackets are connected to the frame members 9 by using the bolts 10, as in Fig. 8.

The tubular bar 1 is passed through the inner coils 6 of the springs and the end members 2 attached thereafter. Any suitable means may be used to secure the springs in place on the tube, and in practice I prefer to drive a wedge shaped approximately to conform to the space appearing at the inner end of the inner coil 6 between the tube and the adjacent portion of the spring but somewhat thicker than the distance between the tube and coil so that the tube is pressed tightly against the diametrically opposite side of the inner coil, thereby securely locating and holding the spring in fixed position with reference to the tube.

In Figs. 5 to 8 inclusive, a somewhat different specific structure is shown, the tube 1ª being formed at its ends into flattened, flared and rearwardly curved sections 2ª, terminating in suitable eyes 5ª, as shown, the impact member being integrally formed from one length of tubing instead of using a shorter length of tubing and attaching separate end members to the ends thereof, as in Figs. 1 and 2. The springs are of different form, including the outer coils 7 but having only parts of the inner coils at the back, against which the tube 1ª bears, it being evident that it would be impossible to pass the ends of the impact member through inner coils, such as those shown at 6 in the first described springs. In order to connect the impact member with the springs, U clips 14 are used, the ends of which pass through openings in the inner end portions of the springs, having nuts screwed thereon to draw the clips tight against the tube and clamp the tube to the said springs. Otherwise the structure is the same as previously described, in so far as the manner of mounting the bumper on the motor vehicle is concerned.

Figure 8:
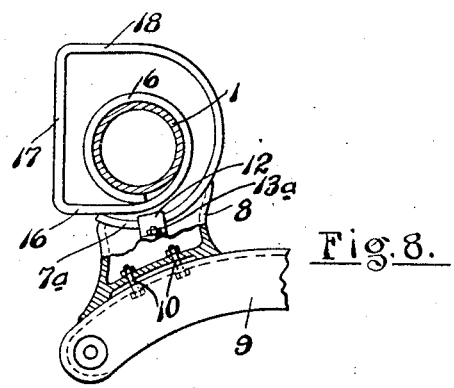
Fig. 8 is a like view showing a slightly different form of supporting spring for the rigid bumper bar.

In Fig. 8, a different specific form of spring mount is shown. The spring includes the inner coil 6, which instead of being continued in the outer coil 7 is extended forward horizontally from the lower side of coil 6, making a short section 16 which is bent at right angles to make a vertical section 17, then again bent at right angles backward, making a section 18 which terminates in a downwardly curved section similar in all respects to the rear portion of the coil 7 first described. This rear section terminates in a part 7ª identical with the terminal outer end section of the spring shown in Fig. 3.

For the rear of a motor vehicle, the central portion of the tube may be eliminated, leaving two end bumper sections or fender guards which may be supported on the chassis frame members in a manner similar to the support illustrated for the front bumper.

With a bumper constructed as described, the impact member is rigid but yieldingly supported by spring members which give under impact and absorb, more or less, the shocks of impact. The springs wound around the tubular impact member are tensioned when the rigid impact member is subjected to shocks and the force of impact is not immediately and abruptly transmitted to the chassis frame but is softened and more or less absorbed with a saving of the vehicle from injury. The rearwardly curved end portions on the impact member turn in toward the vehicle and thus insure against a catching or interlocking with the ends of bumpers on other vehicles. The springs being of greater height than the diameter of the tubular impact member and having their outer portions set out farther than the outer sides of the impact member, present impact surfaces against which bumpers on other vehicles may engage, and it is not necessary to widen the impact surface of the bar, or make a double bar impact member in order to stop other bumpers from passing over or under the impact member in this bumper construction. The construction is simple, economical to produce in quantity, and thoroughly effective to serve the purposes for which it is designed. The appended claims define the invention which is to be considered comprehensive of all forms of structure coming within their scope.

I claim:

1. A bumper comprising an impact bar adapted to be extended transversely across an end of a motor vehicle, said bar at each end being provided with widened and flared and inwardly curved end portions, and supports for said bar inwardly from each end thereof.

2. A bumper comprising an elongated impact bar provided at each end with portions progressively widened and flared outwardly toward the outer ends thereof and also curved inwardly, and supports for the bar located one toward each end of the bar.

3. A bumper comprising an elongated bar, a support attached a distance inward from each end of the bar, said support comprising a spirally wound band spring having inner and outer coil portions, said bar passing through the inner coils and being fixedly secured with respect thereto, and supporting brackets adapted to be attached to motor vehicle chassis frame members connected to the end portions of the outer coils, substantially as described.

4. A bumper impact member, comprising a horizontally positioned bar and an end member connected at each end of the bar, each of said end members being extended outwardly from the adjacent end of the bar, widened and flared vertically and curved away from the plane of the bar, substantially as described.

5. A bumper impact member, comprising an intermediate bar, and an end member connected with each end of the bar, each of the end members including a sleeve to pass over the end of the bar and a part extending outwardly from said sleeve, said part being widened vertically toward its outer end and curved away from the plane of the bar, substantially as described.

6. A bumper impact member comprising a horizontally positioned bar and an end member connected with each end of the bar having its outer end portion widened vertically, substantially as described.

7. A bumper comprising an elongated impact bar having an intermediate tubular portion, a spirally wound band spring located around said tubular portion adjacent each end thereof and secured thereto, said springs having outer end portions normally spaced from the adjacent inner portions of the springs, and a bracket to which said outer end portion of each spring is secured, said bracket having a concaved face against which the end portion of the spring is brought to bear, said face having a shorter radius of curvature than the end portion of the spring, thereby causing the end of the spring to be brought into bearing engagement with the adjacent inner portion of the spring.

In testimony whereof I affix my signature.

HUSTON TAYLOR.